United States Patent
Yamaguchi et al.

(10) Patent No.: US 11,738,703 B2
(45) Date of Patent: Aug. 29, 2023

(54) POWER SUPPLY SYSTEM IN VEHICLE DOOR

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Koji Yamaguchi, Mie (JP); Hiroki Hirai, Mie (JP); Makoto Higashikozono, Mie (JP); Housei Mizuno, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 215 days.

(21) Appl. No.: 17/429,178

(22) PCT Filed: Jan. 30, 2020

(86) PCT No.: PCT/JP2020/003292
§ 371 (c)(1),
(2) Date: Aug. 6, 2021

(87) PCT Pub. No.: WO2020/170744
PCT Pub. Date: Aug. 27, 2020

(65) Prior Publication Data
US 2022/0017030 A1    Jan. 20, 2022

(30) Foreign Application Priority Data
Feb. 19, 2019 (JP) .................. 2019-027389

(51) Int. Cl.
*B60R 16/033* (2006.01)
*H02J 50/10* (2016.01)
*H02J 50/80* (2016.01)

(52) U.S. Cl.
CPC ............ *B60R 16/033* (2013.01); *H02J 50/10* (2016.02); *H02J 50/80* (2016.02); *H02J 2310/46* (2020.01)

(58) Field of Classification Search
CPC ........ B60R 16/03; B60R 16/033; H02J 50/05; H02J 50/10; H02J 50/12; H02J 50/80; H02J 2310/40; H02J 2310/46; H02J 2310/48
See application file for complete search history.

(56) References Cited

U.S. PATENT DOCUMENTS

| 6,535,133 B2 * | 3/2003 | Gohara | H02J 50/10 320/108 |
| 2010/0201479 A1 * | 8/2010 | Popowski | E05B 47/06 340/5.7 |

(Continued)

FOREIGN PATENT DOCUMENTS

| JP | 07-212992 | 8/1995 |
| JP | 11-198742 | 7/1999 |
| JP | 2013-112111 | 6/2013 |
| JP | 2016-194841 | 11/2016 |

OTHER PUBLICATIONS

International Search Report issued in International Patent Application No. PCT/JP2020/003292, dated Mar. 3, 2020, along with an English translation thereof.

(Continued)

*Primary Examiner* — Levi Gannon
(74) *Attorney, Agent, or Firm* — GREENBLUM & BERNSTEIN, P.L.C.

(57) ABSTRACT

An object is to reduce the number of wiring members located between a door and a vehicle body. A power supply (Continued)

system in a vehicle door includes: a non-contact power receiving part receiving a power supply in a non-contact manner; a battery connected to the non-contact power receiving part so as to be charged with an electrical power received by the non-contact power receiving part; and an electrical component connected to the battery so as to receive a power supply from the battery in a state where at least the non-contact power receiving part does not receive an electrical power.

3 Claims, 7 Drawing Sheets

(56) References Cited

U.S. PATENT DOCUMENTS

| | | | |
|---|---|---|---|
| 2012/0235788 A1* | 9/2012 | Lakirovich | H01F 38/14 340/5.64 |
| 2013/0136414 A1 | 5/2013 | Takeuchi et al. | |
| 2014/0366450 A1* | 12/2014 | Mizuma | H02J 50/12 49/349 |
| 2016/0221441 A1* | 8/2016 | Hall | H02J 50/005 |
| 2020/0298773 A1* | 9/2020 | Kang | G02F 1/0121 |

OTHER PUBLICATIONS

Japan Office Action issued in Japan Patent Application No. 2019-27389, dated Apr. 26, 2022, together with an English translation thereof.

\* cited by examiner

POWER SUPPLY SYSTEM IN VEHICLE DOOR

TECHNICAL FIELD

The present disclosure relates to a power supply system in a vehicle door.

BACKGROUND ART

Patent Document 1 discloses that a door harness is attached to a door panel and a connector on an end portion of the door harness is connected to a connector on a vehicle body side.

PRIOR ART DOCUMENTS

Patent Documents

Patent Document 1: Japanese Patent Application Laid-Open No. 11-198742

SUMMARY

Problem to be Solved by the Invention

Desired herein is that the number of wiring members located between a door and a vehicle body is reduced.

Thus, an object is to reduce the number of wiring members located between a door and a vehicle body.

Means to Solve the Problem

A power supply system according to the present disclosure includes: a non-contact power receiving part receiving a power supply in a non-contact manner; a battery connected to the non-contact power receiving part so as to be charged with an electrical power received by the non-contact power receiving part; and an electrical component connected to the battery so as to receive a power supply from the battery in a state where at least the non-contact power receiving part does not receive an electrical power.

Effects of the Invention

According to the present disclosure, the number of wiring members located between a door and a vehicle body can be reduced.

DESCRIPTION OF EMBODIMENT(S)

Description of Embodiment of Present Disclosure

Embodiments of the present disclosure are listed and described firstly.

A power supply system in a vehicle door according to the present disclosure is as follows.

(1) A power supply system in a vehicle door includes: a non-contact power receiving part receiving a power supply in a non-contact manner; a battery connected to the non-contact power receiving part so as to be charged with an electrical power received by the non-contact power receiving part; and an electrical component connected to the battery so as to receive a power supply from the battery in a state where at least the non-contact power receiving part does not receive an electrical power.

According to the present disclosure, the battery is charged with the electrical power received by the non-contact power receiving part. The electrical component can operate by the electrical power supplied from the battery in the state where at least the non-contact power receiving part does not receive the electrical power. An object is to reduce the number of wiring members located between a door and a vehicle body.

(2) The electrical power may be supplied from the non-contact power receiving part to the electrical component in a state where the non-contact power receiving part receives the electrical power.

Accordingly, the electrical power can be supplied to the electrical component without a battery consumption.

(3) The power supply system may further include a switching part switching a power supply source for the electrical component between the non-contact power receiving part and the battery.

Accordingly, the electrical power can be supplied to the electrical component while switching the power supply source between the non-contact power receiving part and the battery.

(4) The power supply system may further include a wireless communication part for the electrical component to perform a wireless communication with an electrical component on a side of a vehicle body.

Accordingly, the number of wiring members for communication can also be reduced.

Details of Embodiment of Present Disclosure

Specific examples of a power supply system of the present disclosure are described hereinafter with reference to the drawings. The present invention is not limited to these examples, but is indicated by claims, and it is intended that meanings equivalent to claims and all modifications within a scope of claims are included.

Embodiment 1

Figure 1:
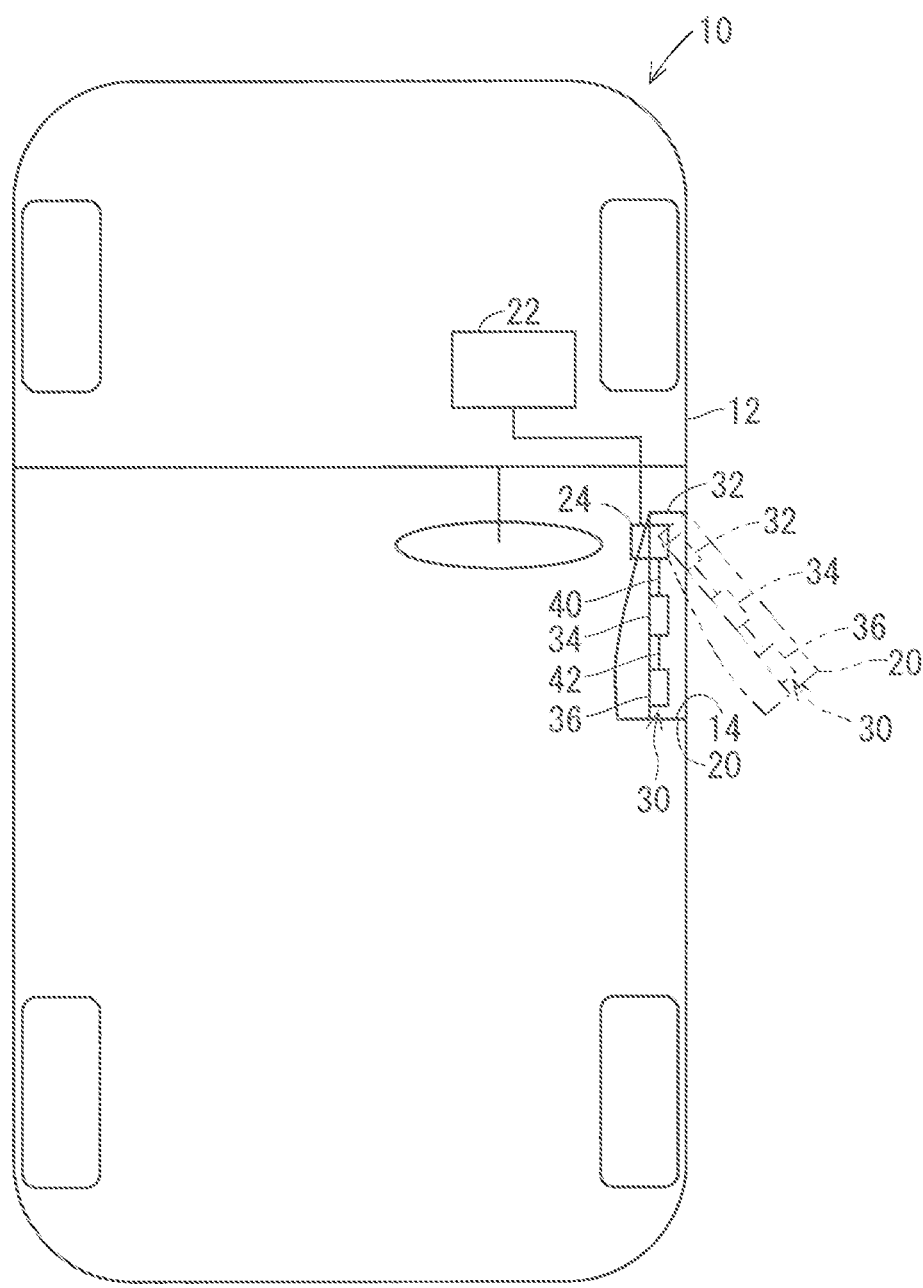
FIG. 1 is a drawing illustrating a state where a power supply system according to an embodiment is incorporated into a door of a vehicle.

A power supply system in a vehicle door according to an embodiment 1 is described hereinafter. FIG. 1 is a drawing illustrating a state where a power supply system 30 is incorporated into a door 20 of a vehicle 10. In FIG. 1, a state where the door 20 is closed is illustrated by a solid line, and a state where the door 20 is opened is illustrated by a dashed-two dotted line.

In the vehicle 10, a vehicle body 12 is provided with a door opening 14 through which a passenger gets in and out of the vehicle 10, and the door opening 14 is opened and closed by the door 20. Described herein is an example that a front part of the door 20 is connected to the vehicle body via a hinge part, and the door 20 is opened and closed with respect to the door opening 14 via the hinge part. Described herein is an example that the door 20 is a door for a driver seat, however, the door 20 may also be a door for a front passenger seat or a door for a rear seat. The door may be a door for a trunk openable and closable to cover an opening for taking a luggage in and out of the vehicle 10. The door may be a sliding door.

A power supply source 22 and a non-contact power supply part 24 are incorporated into the vehicle body 12. The power supply source 22 may be a battery for auxiliary machine or a power-generating machine. The battery for auxiliary machine is a battery supplying an electrical power to various electrical components (a control apparatus, a light emitting part, and an actuator, for example) mounted to the vehicle. The power-generating machine is a machine converting mechanical energy by an internal-combustion engine mounted to the vehicle into electrical energy. When the vehicle 10 is an electrical vehicle or a hybrid vehicle, the power supply source 22 may be a motive power battery. The power supply source 22 may be provided in any position in the vehicle body 12.

The non-contact power supply part 24 is a component supplying the electrical power from the power supply source 22 to a non-contact power receiving part 32 described hereinafter in a non-contact manner. The non-contact power supply part 24 is provided in a position in the vehicle body 12 adjacent to at least a part of the door 20.

The power supply system 30 includes the non-contact power receiving part 32, a battery 34, and the electrical component 36, and is incorporated into the door 20.

The non-contact power receiving part 32 is a component receiving the power supply from the non-contact power supply part 24 in a non-contact manner.

The battery 34 is a rechargeable secondary battery, and is connected to the non-contact power receiving part 32 so as to be charged with the electrical power received by the non-contact power receiving part 32.

The electrical component 36 is an electrical component incorporated into the door 20. The electrical component 36 is connected to the battery 34 so as to receive the electrical power from the battery 34 in a state where the non-contact power receiving part 32 does not receive the electrical power. Assumed as the electrical components incorporated into the door 20 are a footlight, a power window motor, a door mirror motor, and a door lock motor, for example. The footlight is a light illuminating a lower side with respect to the door 20. The power window motor is a motor for opening and closing a door window. The door mirror motor is a motor for adjusting a direction in which a door mirror moves and changing a posture of the door mirror between a retracting state and an unretracting state. The door lock motor is a motor for locking and unlocking the door. The electrical component connected to the battery 34 is preferably used in a state where the door 20 is opened, and preferably includes a footlight.

Figure 2:
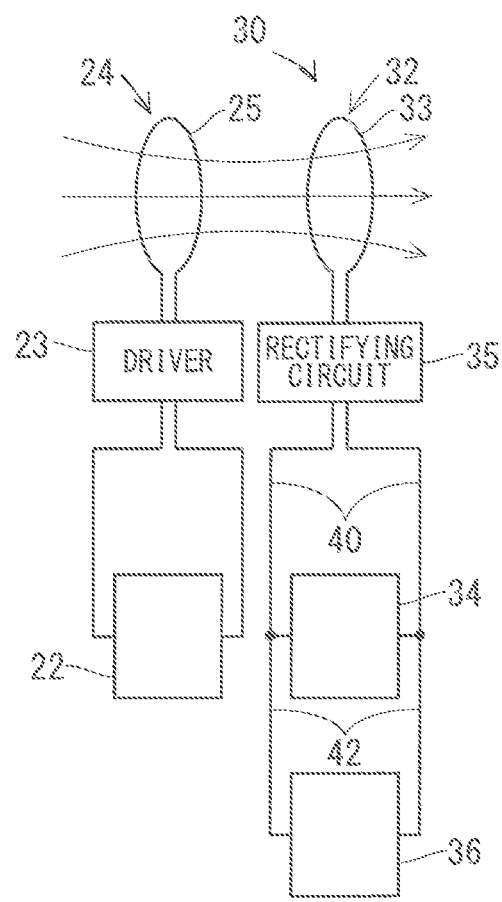
FIG. 2 is a block diagram illustrating the power supply system.

FIG. 2 is a block diagram illustrating the power supply system 30. As illustrated in FIG. 2, the power supply source 22 and the non-contact power supply part 24 are provided in the vehicle body 12. The power supply source 22 and the non-contact power supply part 24 are connected via a driver 23 so that the electrical power from the power supply source 22 can be supplied to the non-contact power supply part 24. The non-contact power supply part 24 includes a power supply coil 25, for example. The electrical power from the power supply source 22 is transmitted from the non-contact power supply part 24 to the non-contact power receiving part 32 as energy (electromagnetic wave energy, for example) by driving the driver 23.

The non-contact power receiving part 32 includes a power supply coil 33, for example, and receives energy as the electrical power from the power supply coil 25 described above.

The battery 34 is connected to the non-contact power receiving part 32 via a wire 40. A covering wire, for example, is used as the wiring 40. A rectifying circuit 35 is interposed in the wiring 40, and an alternating waveform received by the non-contact power receiving part 32 is rectified into a direct waveform. The battery 34 is charged with the electrical power received by the non-contact power receiving part.

The electrical component 36 is connected to the battery 34 via a wire 42. A covering wire, for example, is used as the wiring 42. The electrical component 36 is driven by the electrical power supplied from the battery 34. Herein, the electrical component 36 is also connected to the non-contact power receiving part 32 via the wiring 42 and the wiring 40. That is to say, the battery 34 and the electrical component 36 are connected in parallel to the non-contact power receiving part 32. Thus, the electrical component 36 is also driven by the electrical power received by the non-contact power receiving part 32.

In the state where the non-contact power receiving part 32 receives the electrical power, the electrical power received by the non-contact power receiving part 32 is supplied to the battery 34 and the electrical component 36. In the state where the non-contact power receiving part 32 does not receive the electrical power, the electrical power from the battery 34 is supplied to the electrical component 36.

The non-contact power supply part 24 and the non-contact power receiving part 32 described above are provided in positions where the electrical power can be transmitted in a non-contact manner in the state where the door 20 is closed. For example, the non-contact power supply part 24 and the non-contact power receiving part 32 are disposed in positions facing each other in the state where the door 20 is closed. In FIG. 1, the non-contact power supply part 24 is provided in a position closer to a front side of the door opening 14 in the vehicle body 12. The non-contact power receiving part 32 is provided in a position closer to a front side of the door 20.

Figure 3:
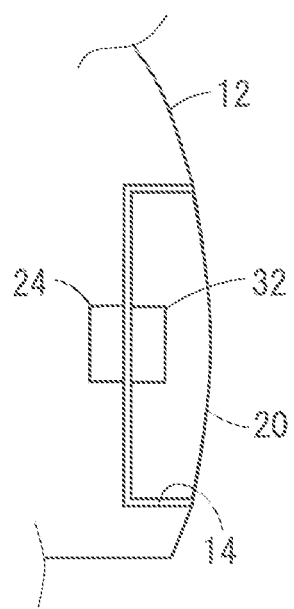
FIG. 3 is a drawing illustrating a door in a closing state.

In the state where the door 20 is closed, as illustrated in FIG. 1 and FIG. 3, the non-contact power supply part 24 and the non-contact power receiving part 32 are disposed to face each other, and the electrical power is transmitted from the non-contact power supply part 24 to the non-contact power receiving part 32. Thus, in the state where the door 20 is closed, the battery 34 is charged with the electrical power supplied from the power supply source 22 provided in the vehicle body 12. The electrical component 36 operates by the electrical power supplied from the power supply source 22 provided in the vehicle body 12.

Figure 4:
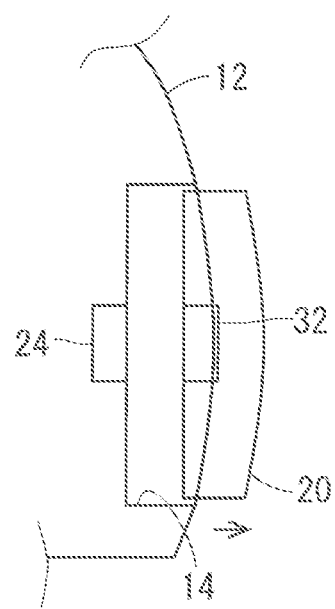
FIG. 4 is a drawing illustrating a door in an open state.

In the state where the door 20 is opened, as illustrated in FIG. 1 and FIG. 4, the non-contact power receiving part 32 is significantly separated from the non-contact power supply part 24, and the electrical power is hardly transmitted or cannot be transmitted from the non-contact power supply part 24 to the non-contact power receiving part 32. The electrical component 36 operates by the electrical power supplied from the battery 34 in the state where the door 20 is opened.

The example of arranging the non-contact power supply part 24 and the non-contact power receiving part 32 is not limited to the above example. For example, it is also applicable that the non-contact power supply part 24 is provided in a position closer to a back side of the door opening 14 and the non-contact power receiving part 32 is provided in a position closer to a back side of the door 20.

All of the electrical components 36 provided in the door 20 need not be connected to the power supply source 22 provided in the vehicle body 12 via the non-contact power supply part 24 and the non-contact power receiving part 32. Some of the plurality of electrical components 36 provided in the door 20 may be connected to the power supply source 22 by a wired power line.

According to the power supply system 30 having such a configuration, the battery 34 is charged with the electrical power received by the non-contact power receiving part 32. The electrical component 36 can operate by the power supply from the battery 34 in the state where at least the non-contact power receiving part 32 does not receive the electrical power. Accordingly, electrical wires for supplying the electrical power can be reduced between the vehicle body 12 and the door 20. For example, all of the electrical components 36 provided in the door 20 are connected to the power supply source 22 provided in the vehicle body 12 via the non-contact power supply part 24 and the non-contact power receiving part 32, an electrical wire for supplying the electrical power between the vehicle body 12 and the door 20 can be omitted.

The electrical power is supplied from the non-contact power receiving part 32 to the electrical component 36 in the state where the non-contact power receiving part 32 receives the electrical power, thus the electrical power can be supplied to the electrical component 36 without consuming the battery 34.

Modification Example

Various modification examples are described based on a premise of the embodiment described above.

Figure 5:
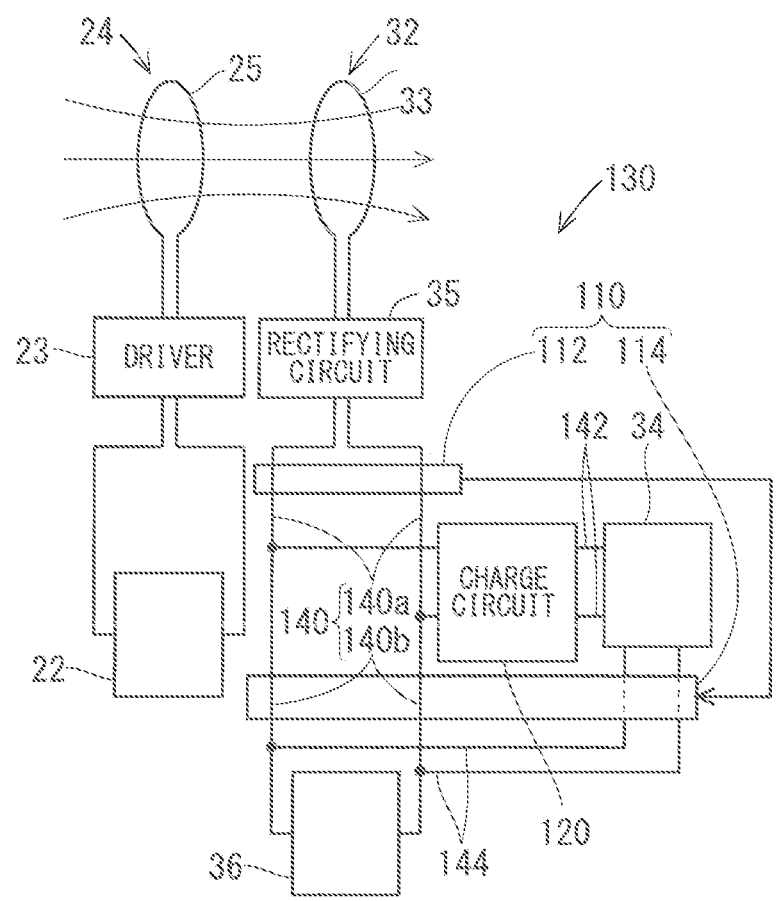
FIG. 5 is a block diagram illustrating a power supply system according to a first modification example.

In a power supply system 130 according to a first modification example illustrated in FIG. 5, the non-contact power receiving part 32 and the electrical component 36 are connected via a wire 140. The battery 34 is connected to a midway portion of the wiring 140 described above via a wire 142 so as to be connected in parallel to the electrical component 36 with respect to the non-contact power receiving part 32. A charge circuit 120 is interposed in the wiring 142. The battery 34 can be charged with small current by the charge circuit 120, thus the battery 34 can be kept in a fully charged condition. The battery 34 and the electrical component 36 are connected via a wire 144.

Provided in the power supply system 130 is a switching part 110 switching a power supply source for the electrical component 36 between the non-contact power receiving part 32 and the battery 34. Herein, the switching part includes a current detection part 112 and a switching circuit 114. The current detection part 112 is interposed in a part 140a between the non-contact power receiving part 32 and the battery 34 in the wiring 140, and detects the current flowing in the wiring 140a. The switching circuit 114 is made up of a relay and a semiconductor switching element, for example, and is interposed in a part 140b between the battery 34 and the electrical component 36 in the wiring 140 and the wiring 144. The switching circuit 114 selectively switches the wiring part 140b and the wiring 14 to a conductive state. In other words, the switching circuit 114 selectively switches between a state where the electrical power is supplied from the non-contact power receiving part 32 to the electrical component 36 and a state where the electrical power is supplied from the battery 34 to the electrical component 36. When the current detection part 112 detects the current flowing in the wiring part 140a, the switching circuit 114 switches the wiring part 140b to the conductive state, and the electrical power is supplied from the non-contact power receiving part 32 to the electrical component 36. In this state, the electrical power is supplied from the non-contact power receiving part 32 to the battery 34 via the charge circuit 120, thus the battery 34 is charged. When the current detection part 112 does not detect the current flowing in the wiring part 140a, the switching circuit 114 switches the wiring 144 to the conductive state, and the electrical power is supplied from the battery 34 to the electrical component 36.

According to this example, the non-contact power receiving part 32 and the battery can be switched to supply the electrical power to the electrical component 36.

In the present modification example, the power supply source is switched between the non-contact power receiving part 32 and the battery 34 depending on whether or not the current is flowed in the wiring part 140a, that is to say, whether or not the non-contact power receiving part 32 receives the electrical power, however, this configuration is not necessarily applied. For example, also in a state where the door 20 is closed and the electrical power is received by the non-contact power receiving part 32, the power supply source can be switched between the non-contact power receiving part 32 and the battery 34 in accordance with the charge state of the battery 34.

Described in the above embodiment and modification example is the example that a power supply path to the electrical component 36 of the door 20 is used for the power supply in a non-contact manner. When the electrical component 36 is a component controlled by an electrical control unit (ECU), for example, a signal line for controlling the electrical component can be unwired.

Figure 6:
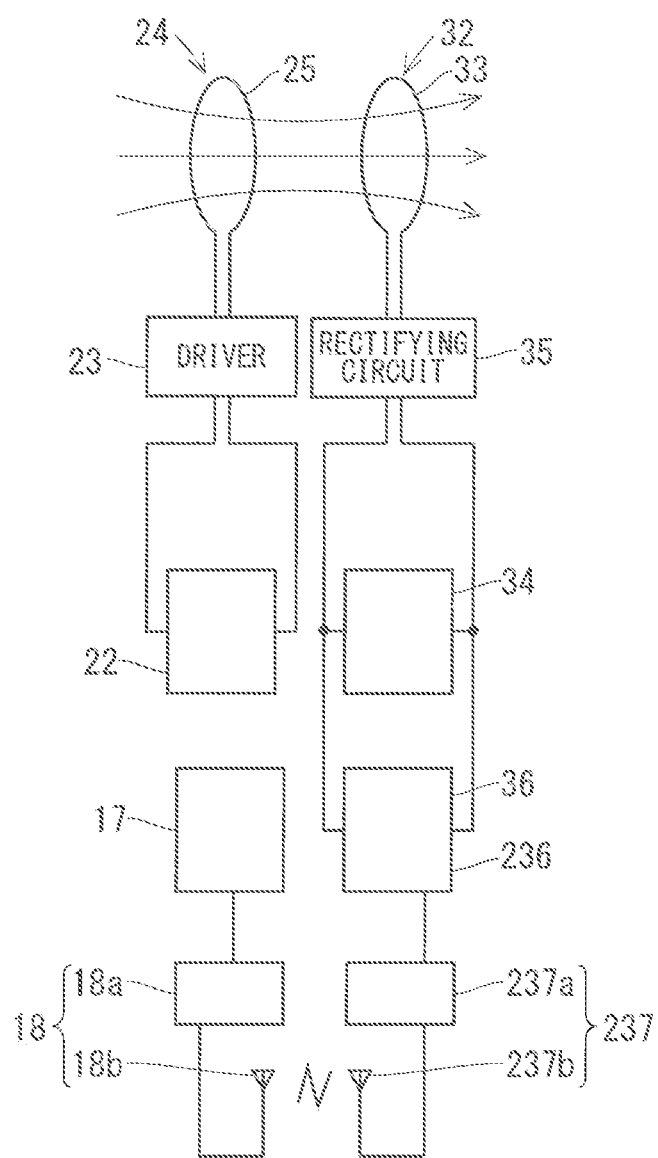
FIG. 6 is a block diagram illustrating a power supply system according to a second modification example.

Assumed in a second modification example illustrated in FIG. 6 is that an electrical component 236 corresponding to the electrical component 36 is a component controlled by an ECU 17 provided in the vehicle body 12. The electrical power is supplied to the electrical component 236 by the power supply system described in the embodiment described above.

A wireless communication part 18 is connected to the ECU 17 described above. The wireless communication part 18 includes a wireless communication circuit 18a and an antenna 18b. The wireless communication part 18a and the antenna 18b are provided in the vehicle body 12.

A wireless communication part 237 is connected to the electrical component 236. The wireless communication part 237 includes a wireless communication circuit 237a and an antenna 237b. The wireless communication circuit 237a and the antenna 237b are provided in the door 20.

The ECU 17 and the electrical component 236 can have wireless communication via the wireless communication part 18 and the wireless communication part 237. An instruction from the ECU 17 is wirelessly transmitted to the electrical component 236 via the wireless communication part 18 and the wireless communication part 237, and the electrical component 236 can operate in accordance with the instruction.

According to the present example, the number of wiring members for communication can also be reduced between the vehicle body 12 and the door 20. It is sufficient that at least some of the wiring members for communication between the vehicle body 12 and the door 20 are unwired, however, if all types of communication are unwired, the wiring member for communication is omitted. In the above embodiment, when all the wiring members for supplying the electrical power are omitted between the vehicle body 12 and the door 20 and all the wiring members for communication are omitted between the vehicle body 12 and the door 20 by applying the present modification example, all the wiring members between the vehicle body 12 and the door 20 are omitted. When all the wiring members between the vehicle body 12 and the door 20 are omitted, a grommet located therebetween is unnecessary.

It is also applicable that a signal is superposed on electromagnetic wave energy for supplying the electrical power described above in a non-contact manner and transmitted to the electrical component 236 on a side of the door 20.

Figure 7:
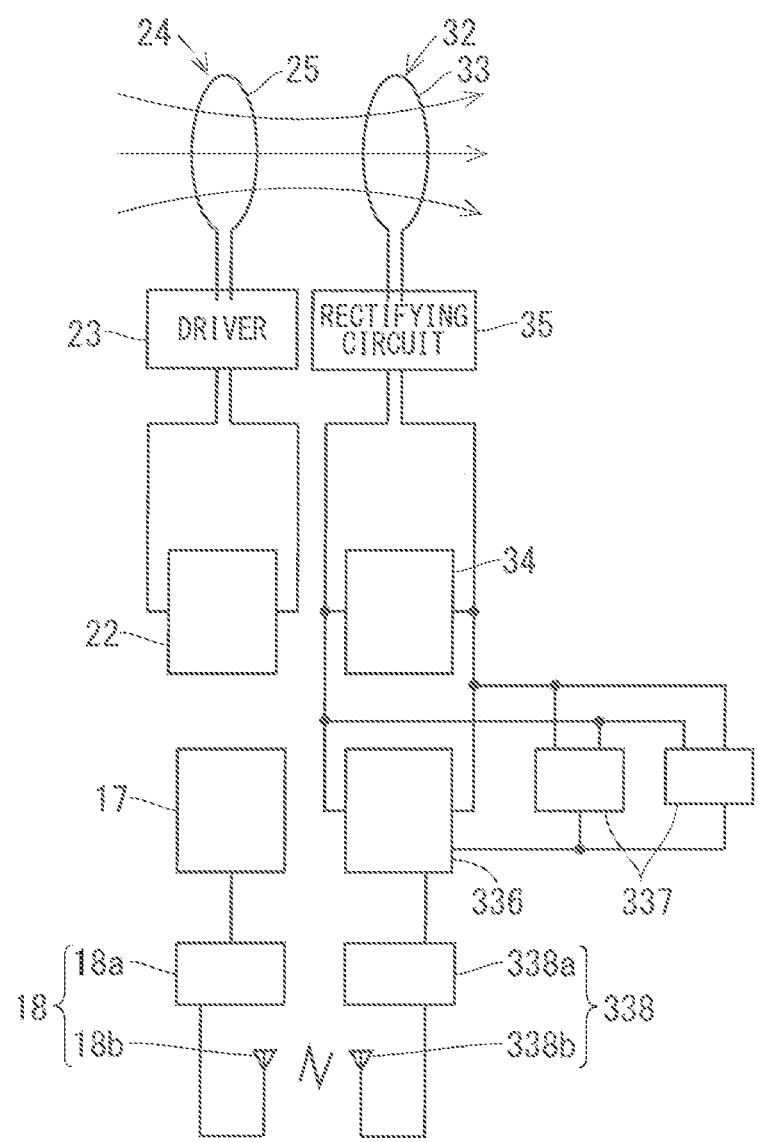
FIG. 7 is a block diagram illustrating a power supply system according to a third modification example.

In the second embodiment according to FIG. 7, an ECU 336 as an electrical component and an electrical component 337 controlled by the ECU 336 are provided in the door 20. The electrical power is supplied to the ECU 336 and the electrical component 337 by the power supply system described in the above embodiment.

A wireless communication part 338 is connected to the ECU 336. The wireless communication part 338 includes a wireless communication circuit 338a and an antenna 338b. The wireless communication circuit 338a and the antenna 338b are provided in the door 20.

The ECU 17 as the electrical component provided in the vehicle body 12 and the ECU 336 provided in the door 20 can have wireless communication via the wireless communication part 18 and the wireless communication 338. An instruction from the ECU 17 is wirelessly transmitted to the ECU 336 via the wireless communication part 18 and the wireless communication part 338. The ECU 336 can control the electrical component 337 in accordance with the instruction from the ECU 17, and the electrical component 337 operates in accordance with an instruction from the ECU 336.

An effect similar to that of the above second modification example can also be obtained in accordance with the present example. The ECU 336 can control the plurality of the electrical components 337.

Each configuration described in the above embodiments and modification examples thereof can be appropriately combined as long as they are not contradictory. For example, the second modification example and the third modification example are combined with the above first modification example to unwire the power supply path and the communication path.

EXPLANATION OF REFERENCE SIGNS 10 vehicle
12 vehicle body
14 door opening
17 ECU
18 wireless communication part
18 wireless communication circuit
18b antenna
20 door
22 power supply source
23 driver
24 non-contact power supply part
25 power supply coil
30 power supply system
31 non-contact power receiving part
32 non-contact power receiving part
33 power supply coil
34 battery
35 rectifying circuit
36 electrical component
40 wiring
42 wiring
110 switching part
112 current detection part
114 switching circuit
120 charge circuit
130 power supply system
132 current detection part
140 wiring
140a wiring part
140b wiring part
142 wiring
144 wiring
236 electrical component
237 wireless communication part
237a wireless communication circuit
237b antenna
336 ECU
337 electrical component
338 wireless communication part
338a wireless communication circuit
338b antenna

The invention claimed is:

1. A power supply system in a vehicle door, comprising:
a non-contact power receiving part receiving a power supply in a non-contact manner;
a battery connected to the non-contact power receiving part so as to be charged with an electrical power received by the non-contact power receiving part; and
an electrical component connected to the battery so as to receive a power supply from the battery in a state where at least the non-contact power receiving part does not receive an electrical power, wherein
the power supply system further includes a switching part switching a power supply source for the electrical component between the non-contact power receiving part and the battery,
the switching part detects current from the non-contact power receiving part, and when the current from the non-contact power receiving part is detected, the electrical power is supplied from the non-contact power receiving part to the electrical component and the electrical power is not supplied from the battery to the electrical component, and when the current from the non-contact power receiving part is not detected, the electrical power is supplied from the battery to the electrical component,
an electrical component provided in a vehicle door, which is different from the electrical component, is connected to a power supply source provided in a vehicle body by a wired power line, and
the non-contact power receiving part is provided in a part of the vehicle door directed to a vehicle interior, and faces a non-contact supply part provided on a side of the vehicle body in a state where the vehicle door is closed.

2. The power supply system in the vehicle door according to claim 1, wherein
an electrical power is supplied from the non-contact power receiving part to the electrical component in a state where the non-contact power receiving part receives the electrical power.

3. The power supply system in the vehicle door according to claim 1, further comprising
a wireless communication part for the electrical component to perform a wireless communication with an electrical component on a side of a vehicle body.

* * * * *